United States Patent Office 2,763,529
Patented Sept. 18, 1956

2,763,529
COMPOSITIONS AND PROCESS FOR DYEING NITROGENOUS FIBERS USING AMINE-ETHYLENE OXIDE PRODUCT

Otto Albrecht, Neuewelt, near Basel, Jules Meyer, Basel, Fritz Schuetz, Neuewelt, near Basel, and Hans Roesti, Binningen, Switzerland, assignors to Ciba Limited, Basel, Switzerland, a Swiss firm No Drawing. Application January 21, 1952,
Serial No. 267,500

Claims priority, application Switzerland February 1, 1951

6 Claims. (Cl. 8—30)

Various processes are known for dyeing nitrogenous fibers, such as wool, silk, synthetic fibers having similar properties and prepared from casein or polyamide or polyurethane fibers, and especially for dyeing wool, with metallizable dyestuffs. One such process consists in dyeing the fiber with the metal-free dyestuff and after-treating the dyeing with an agent yielding metal. A further process consists in dyeing the fiber in a dyebath which contains the agent yielding metal and also the metal-free dyestuff. Thus, in the case of chromable dyestuffs and agents yielding chromium, these processes are referred to as the after-chroming process and the single-bath chroming process.

It is known that not all metallizable dyestuffs are equally suitable for the two dyeing processes referred to above. Thus, there are dyestuffs which can be used only for dyeing by the after-metallizing process and are unsuitable for the single-bath metallizing process, and vice versa. Certain dyestuffs occupy an intermediate position in that they can be used for dyeing by both processes. It is probable that the suitability of various dyestuffs for one or other of the processes is connected with their capacity for absorption from the particular dyebath in which they are used.

The present invention is based on the observation that the absorptive capacity of metallizable wool dyestuffs in dyeing by the single-bath metallizing process can be increased by incorporating in the dyebath non-ionogenic surface-active compounds of the type of polyglycol ethers as hereinafter defined.

The present invention, therefore, provides a process for dyeing nitrogenous fibers with metallizable wool dyestuffs by the single-bath metallizing process in the presence of an agent yielding metal, wherein the dyebath contains an addition of at least one water-soluble reaction product of at least 4 mols of an $\alpha:\beta$-alkylene oxide with 1 mol of an organic compound which contains at least one basic, primary or secondary amino group or a basic tertiary amino group and in addition an alcoholic hydroxyl group, and at most two amino groups bound to the same carbon atom, or a salt or an acid sulfuric acid ester or quaternary ammonium compound of such reaction product. The expression "mol" is used herein to denote a molecular proportion.

As starting materials for making the reaction products used in the invention there come into consideration $\alpha:\beta$-alkylene oxides, such as ethylene oxide, propylene oxide or glycide. Especially valuable products are obtained by using ethylene oxide as starting material.

As organic compounds which contain at least one basic, primary or secondary amino group or a basic tertiary amino group and in addition an alcoholic hydroxyl group and at most two amino groups bound to the same carbon atom, there may be used amines of the aliphatic, aromatic or alicyclic series. Among those of the aliphatic series there may be mentioned: monamines, for example, methylamine, ethylamine, diethylamine, butylamine, hexylamine, dodecylamine, cetylamine, oleylamine, or octadecylamine, and also polyamines such as ethylene diamine or triethylene tetramine. There may also be used basic derivatives of such amines such as the esters of hydroxyamines with higher fatty acids, for example, the triethanolamine ester of coconut fatty acids, or partial amides of polyamines with fatty acids, for example triethylene tetramine monoacylated with coconut oil fatty acids. Among the amines of the aromatic series there come into consideration above all amines of the benzene and naphthalene series containing alkyl side chains having, for example 8–18 carbon atoms. Among those of the alicyclic series there are advantageously used resin amines such as abietylamine, abietylmethylamine, the amine mixture corresponding to tall oil which contains resin amines in addition to higher alkylamines, or hydrogenated abietylamine. There may also be used as starting materials amidines, such as lauric acid or stearic acid amidine.

For the present invention there are suitable products which are obtainable by the reaction of 1 mol of an amine with at least 4 mols, for example, 4–50 mols, of an alkylene oxide, for example, the reaction product of 1 mol of dodecylamine with about 6 mols of ethylene oxide, the reaction product of 1 mol of oleylamine with 6, 8 or 16 mols of ethylene oxide, the reaction product of 1 mol of stearylamine with 8 or 16 mols of ethylene oxide and also the condensation product of 1 mol of the monoester of triethanolamine with coconut oil fatty acids and 6 mols of ethylene oxide or the condensation product of 1 mol of triethylene tetramine monoacylated with coconut oil fatty acids and 20 mols of ethylene oxide. There are also very suitable for the purposes of the invention condensation products from 1 mol of a resin amine or hydrogenated resin amine with 5 mols of ethylene oxide or condensation products from 1 mol of an ordinary commercial mixture of resin amines and of higher alkylamines with 16 mols of ethylene oxide.

The condensation products can be made by methods usual for making such products, for example, they can be made by reacting the components at a raised temperature. Advantageously, the whole alkylene oxide is not added to the amine in one portion, but is gradually added, for example, by adding it to or introducing it into the amino compound in gaseous or liquid form at a temperature at which the alkylene oxide enters into reaction, for example, at 50–200° C. If required, the reaction may be carried out in a closed vessel under superatmospheric pressure, advantageously at 2–10 atmospheres (gauge pressure). Catalysts may be added to the reaction mixture if necessary. As catalysts there come into consideration advantageously substances of alkaline reaction, such as metallic sodium, alkali hydroxides, alkali carbonates or alkali salts of carboxylic acids of low molecular weight.

The condensation products used in the invention are soluble in water. If desired, the solubility in water may be increased by the formation of water-soluble salts or by introducing groups enhancing the solubility in water. Thus, for example, there may be used quaternary ammonium salts which contain alkylene glycol chains derived from $\alpha:\beta$-alkylene oxides and are obtained, for example, by the additive combination of alkylating agents with reaction products of the primary, secondary or tertiary amines of the aforementioned kind with the alkylene oxides. There may be mentioned the quaternary ammonium salt which is obtained by quaternating with dimethyl sulfate the reaction product of oleylamine with 6–10 mols of ethylene oxide. Furthermore, acid sulfuric acid esters of the condensation products can be used. There may be mentioned, for example, the ester which is formed when chlorosulfonic acid is caused to react in the presence of pyridine on the condensation product of 5 mols of ethylene oxide and 1 mol of methyllaurylamine.

Instead of the reaction product of an alkylene oxide with a primary, secondary or tertiary amine of the aforementoned kind there may be used products which are obtained by introducing polyglycolether chains having a corresponding number of ether groups into the amines.

Instead of a single condensation product a mixture of several such products may be used.

As dyestuffs, which are suitable for use in the present process, there come into consideration those which have hitherto been used for dyeing by the single-bath metallizing process, but more especially those which have hitherto been unsuitable or little suited for that dyeing process. Suitable dyestuffs are especially ortho:ortho'-dihydroxyazo-dyestuffs, ortho-hydroxy-ortho'-amino-azo - dyestuffs, ortho-hydroxy-ortho'-carboxy-azo-dyestuffs, which contain sulfonic acid groups and/or carboxylic acid groups, and also dyestuffs which contain a salicylic acid grouping, and finally carboxylic acid esters of ortho:ortho'-dihydroxyazo-dyestuffs, in which one or both of the hydroxyl groups present in ortho-position relatively to the azo group may be esterified. Such dyestuff esters are described in French Patents Nos. 914,640 and 940,852.

In accordance with the invention dyeing is carried out by the single-bath process with solutions which contain the dyestuff and also an agent yielding metal, for example, an agent yielding chromium.

As agents yielding chromium there may be used, for example, an alkali chromate, such as sodium chromate or potassium chromate, advantageously in admixture with ammonium sulfate.

As agents yielding cobalt there may be used watersoluble salts of cobalt. There may be mentioned salts of inorganic acids such as sulfuric acid or hydrochloric acid, and also salts of organic acids such as acetic acid, oxalic acid, tartaric acid, lactic acid or salicylic acid. When cobalt salts of strong acids are used it is of advantage to add to the dyebath a buffer substance such, for example, as sodium acetate, in order to render harmless the acid formed during the metallizing process.

The above described condensation products are used in accordance with the invention in a simple manner by dissolution in the dyebath. In general small quantities suffice to produce the desired effect. In most cases 0.25–2.5 parts of the condensation product to 1 part of dyestuff suffice. The quantity of the condensation product to be used depends on the absorptive capacity of the dyestuff used.

Instead of adding the condensation product, the dyestuff and the agent yielding metal separately to the dyebath, there may be used dyestuff preparations which contain two of the three components. It is possible, on the one hand, to prepare the dyestuff preparation from the condensation product and the dyestuff, or on the other hand, a preparation may be made from the condensation product and the agent yielding metal. In either case the preparation can be made in a simple manner by mixing and/or grinding the components, if desired, with the addition of a diluent such as dextrin or urea.

The dyebath in which the dyestuff, the agent yielding metal and the condensation product are dissolved may be neutral, weakly alkaline or weakly acid. It may be of advantage at the outset of the dyeing process to maintain the dyebath weakly alkaline, for example, by the addition of ammonia and towards the end of the dyeing operation to render the dyebath acid by the addition of acetic acid or dilute sulfuric acid.

As materials to be dyed by the present process there come into consideration nitrogenous, natural or synthetic fibers such, for example, as silk, synthetic fibers of casein, polyamide fibers or polyurethane fibers, but especially wool. The material to be dyed may be present in any desired form, for example, in the form of yarn or fabric, or in loose form, for example in the form of loose wool.

In the case of many dyestuffs the use of the above described condensation products may not only improve the absorptive capacity, but may also produce a greater levelness and depth of dyeing. The favorable effect of the described products on the levelness of the dyeings is especially valuable and important in the dyeing of loose wool. Thus, it is possible to combat the tippy dyeing of loose wool by the use of the condensation products.

Furthermore, it may also be of advantage to incorporate in the dyebath in addition to a condensation product of the kind described above, a magnesium salt or an alkaline earth metal salt provided that the latter does not form a precipitate with a constituent of the dyebath. By such an addition the absorptive capacity of the dyestuff can, if desired, be still further increased.

The invention is also based on the observation that the fastness to rubbing of the dyeings obtained by the process of the invention can, if desired, be realized by aftertreating the dyeing with a solution of an alkali salt of an alkyl-aromatic sulfonic acid of which the alkyl radical contains 6 or more carbon atoms. This after-treatment can be brought about towards the end of the dyeing operation by dissolving in the dyebath an alkali salt of an alkyl-arylsulfonic acid. However, it is preferable to carry out the after-treatment in a fresh bath. In general small quantities of such alkali salts suffice, for example, 1 per cent. calculated on the weight of the fibrous material. There are suitable, for example, alkali salts of alkyl-arylsulfonic acids which are known under the names of Phenyl-kogasin-sulfonic acid and Oronite-alkane-sulfonic acid.

The following examples illustrate the invention, the parts and percentages being by weight.

*Example 1*

Wool is dyed at a goods-to-liquor ratio of 1:40 in a dyebath which contains, calculated on the weight of the wool, 1.2% of sodium monochromate,
1.8% of ammonium sulfate,
10% of crystalline sodium sulfate,
1% of the azo-dyestuff obtained by coupling diazotized 1-hydroxy-2-amino-4-nitrobenzene with 1:3-diaminobenzene-4-sulfonic acid,
1% of the reaction product described below of 6 mols of ethylene oxide and 1 mol of commercial dodecylamine.

The wool is entered into the dyebath at 60° C., the bath is heated to the boil in the course of 30 minutes and dyeing is carried on for ¾ of an hour at the boil. 0.5% of acetic acid is added to the dyebath and dyeing is continued for a further ¾ of an hour at the boil.

There is obtained a strong brown dyeing, whereas if the dyeing is carried out without the aforesaid auxiliary substance a weak useless dyeing is obtained.

The fastness to rubbing of the dyeing can be improved to some extent by incorporating in the dyebath at the outset 2% of a concentrated solution of ammonia calculated on the weight of the wool, and, after boiling for ¾ of an hour adding 0.5% of acetic acid and dyeing at the boil for a further 45 minutes.

The above mentioned auxiliary substance may be prepared as follows:

20 parts of commercial dodecylamine are heated to 125° C., and then ethylene oxide is introduced in a finely distributed condition at 120–125° C. until 22.4 parts have been taken up. The amine derivative so obtained is an oil which is easily soluble in water.

*Example 2*

Wool is dyed at a goods-to-liquor ratio of 1:40 in a bath which contains, calculated on the weight of the wool, 1.2% of sodium monochromate,
1.8% of ammonium sulfate,
10% of crystalline sodium sulfate,
1% of the azo-dystuff obtained by coupling diazotized 1-hydroxy-2-amino-4-nitrobenzene with 1:3-diaminobenzene-4-sulfonic acid, 1% of the reaction product described below of ethylene oxide and hydrogenated abietylamine.

The wool is entered in the dyebath at 60° C., the bath is heated to the boil in the course of 30 minutes and dyeing is carried on at the boil for 1½ hours.

There is obtained a strong brown dyeing, whereas if the dyeing is carried out without the aforesaid auxiliary substance a weak useless dyeing is produced.

The above-mentioned auxiliary substance may be prepared as follows: 80 parts of ethylene oxide are introduced in the course of about 2–3 hours at 158–163° C. into 144 parts of hydrogenated abietylamine (Rosin Amine D), in which 0.2 part of metallic sodium is suspended. At the end of the reaction some sodium is still present, and this is removed mechanically.

The reaction product is a pale colored very viscous mass, which is clearly soluble in a large quantity of water with the addition of a small amount of acid.

*Example 3*

Wool is dyed at a goods-to-liquor ratio of 1:40 in a bath which contains, calculated on the weight of the wool, 1.2% of sodium monochromate,
1.8% of ammonium sulfate,
10% of crystalline sodium sulfate,
1.22% of the azo-dyestuff obtained by coupling diazotized 1-amino-2-hydroxy-naphthalene-4-sulfonic acid with 2-hydroxy-naphthalene,
0.5% of the reaction product described below of ethylene oxide and hydrogenated abietylamine or a water-soluble salt of such reaction product.

The wool is entered into the dyebath at 60° C., the bath is heated to the boil in the course of 30 minutes, and dyeing is carried on at the boil for 1½ hours.

There is obtained a strong blue dyeing, whereas if the dyeing is carried out without the aforesaid auxiliary substance a weak useless dyeing is produced.

The auxiliary substance referred to above may be prepared as follows: 138 parts of ethylene oxide are introduced in the course of about 3–4 hours at about 160° C. into 200 parts of hydrogenated abietylamine, in which 0.1 part of metallic sodium is suspended. At the end of the reaction a very small amount of metallic sodium remains, and this is removed mechanically.

The reaction product is a pale colored very viscous mass, which is clearly soluble in a large quantity of water with the addition of a small amount of acetic acid or mineral acid.

Instead of the above auxiliary substance there may be used the condensation product of 1 mol of para-dodecyl-aniline with 8 mols of ethylene oxide.

*Example 4*

The procedure is the same as that described in Example 3, except that instead of the ethylene oxide derivative described in that example, there is used 1% of the product obtained in the following manner: 73 parts of triethylene tetramine are heated to 145° C., and then 106 parts of coconut oil fatty acids are introduced while stirring in the course of 5 hours at 145–150° C., while introducing nitrogen. The whole is then stirred for 4 hours at 140–145° C. 25 parts of the amide so obtained are heated to 160–170° C., and then 0.12 part of finely divided sodium is added, and ethylene oxide is introduced until 70.4 parts have been taken up. Care must be taken to ensure a fine distribution of the gas stream. The reaction temperature is lowered as soon as the absorption of ethylene oxide sets in strongly, and is finally lowered to about 120° C. The product so obtained is a thickly liquid oil which easily dissolves in water.

In producing the dyeing it is of advantage to add to the dyebath at the outset 2% of a concentrated solution of ammonia and after boiling for the first 45 minutes adding 0.5% of acetic acid. A strong dyeing is also obtained in this manner.

*Example 5*

Wool is dyed at a goods-to-liquor ratio of 1:40 in a dyebath which contains, calculated on the weight of the wool, 1.2% of sodium monochromate,
1.8% of ammonium sulfate,
10% of crystalline sodium sulfate,
1.1% of the azo-dyestuff from diazotized 1-amino-2-hydroxy-naphthalene-4-sulfonic acid and 1-phenyl-3-methyl-5-pyrazolone,
2% of the reaction product described in Example 3 from ethylene oxide and hydrogenated abietylamine.

The wool is entered into the dyebath at 60° C., the bath is heated to the boil in the course of 30 minutes and dyeing is carried on at the boil for 1½ hours.

There is obtained a strong red dyeing, whereas if the dyeing is carried out without the aforesaid auxiliary substance a weak useless dyeing is produced.

*Example 6*

Wool is dyed at a goods-to-liquor ratio of 1:40 in a dyebath which contains, calculated on the weight of the wool, 1% of cobalt acetate,
0.5% of acetic acid,
10% of crystalline sodium sulfate,
0.85% of the azo-dyestuff obtained by coupling diazotized 1-hydroxy-2-amino-4-nitrobenzene-6-sulfonic acid with 1-hydroxy-5:8-dichloronaphthalene,
1% of the reaction product described in Example 1 from 6 mols of ethylene oxide and 1 mol of commercial dodecylamine.

The well wetted wool is entered into the dyebath at 60° C., the temperature of the bath is raised to the boil and dyeing is carried on at the boil for 1 hour. The wool is then rinsed and dried. A strong violet-brown dyeing is obtained, whereas if the dyeing is carried out without the aforesaid auxiliary substance only a weak dyeing is produced.

*Example 7*

Wool is dyed at a goods-to-liquor ratio of 1:40 in a dyebath which contains, calculated on the weight of the wool, 1% of cobalt acetate,
0.5% of acetic acid,
10% of crystalline sodium sulfate,
0.85% of the azo-dyestuff obtained by coupling diazotized 1 - hydroxy - 2 - amino - 4 - chlorobenzene - 6 - sulfonic acid with 1 - hydroxy - 5:8 - dichloronaphthalene.
0.5% of the reaction product described in Example 3 from ethylene oxide and hydrogenated abietylamine.

The well wetted wool is entered at 60° C. into the dyebath, the temperature of the bath is raised to the boil, and dyeing is carried on at the boil for 1 hour. The wool is then rinsed and dried. There is obtained a strong violet dyeing, whereas if the dyeing is carried out without the aforesaid auxiliary substance only a weak dyeing is produced.

*Example 8*

The dyeing process is the same as that described in Example 3, but is followed by an after-treatment, in which the dyed wool is treated at the boil for ½ an hour in a fresh bath containing 1% (calculated on the wool) of the sodium salt of Oronite-alkane-sulfonic acid or Phenyl-kogasin-sulfonic acid in solution.

The dyeing so produced is faster to rubbing than a dyeing which has not been so after-tested.

*Example 9*

Wool is dyed at a goods-to-liquor ratio of 1:40 in a dyebath which contains, calculated on the weight of the wool, 1.2% of sodium monochromate,
1.8% of ammonium sulfate,
10% of crystalline sodium sulfate,
1.22% of the azo dyestuff obtained by coupling diazotized 1-amino-2-hydroxynaphthalene-4-sulfonic acid with 2-hydroxynaphthalene, and
5% of the quaternary salt described below of the reaction product of ethylene oxide and hydrogenated abietylamine.

The wool is entered into the dyebath at 60° C., the bath is heated to the boil in the course of 30 minutes and dyeing is carried on at the boil for 1½ hours.

There is obtained a strong blue dyeing, whereas if the dyeing is carried out without the aforesaid auxiliary substance a weak useless dyeing is produced.

The auxiliary substance referred to above may be prepared as follows: 44 parts of ethylene oxide are introduced in the course of about 2–3 hours at 158–165° C. into 64 parts of hydrogenated abietylamine (Rosin Amine D) in which 0.1 part of metallic sodium is suspended. The sodium remaining at the end of the reaction is removed mechanically.

The product is a pale-colored, very viscous mass. 26.8 parts of it are heated for 1½ hours on the water bath with 6.3 parts of dimethylsulfate. The resultant quaternary compound is readily soluble in water.

*Example 10*

The procedure is as described in Example 9, except for the use, instead of the quaternary ammonium salt, of the same quantity of the sodium salt of the acid sulfuric acid ester of the reaction product of 1 mol of methyllaurylamine and 5 mols of ethylene oxide. This ester can be prepared as follows:

40 parts of ethylene oxide are introduced in the course of 4–5 hours at 140–150° C. into 37 parts of methyllauryl amine in which 0.05 part of metallic sodium is suspended. At the end of the reaction, no metallic sodium is left. The reaction product is a pale-colored, somewhat viscous mass.

42.3 parts of this reaction product are then slowly introduced into a mixture of 60 parts of pyridine and 12.8 parts of chlorosulfonic acid. After this, the reaction mixture is stirred for 4 hours at 44° C. It is then cooled to 30° C., and 21.4 parts by volume of concentrated caustic soda solution introduced, so that in the end, the reaction mixture shows a weakly alkaline reaction to Brilliant Yellow paper. The mixture is then allowed to stand over-night before it is suction-filtered to remove the precipitated sodium chloride. The filtrate is washed with pyridine and the combined filtrates are evaporated to dryness under reduced pressure.

The dry product is a brown greasy mass which dissolves easily in water.

What is claimed is:

1. A process for dyeing nitrogenous fibers with metallizable wool dyestuffs by the single bath metallizing process in the presence of an agent yielding metal, which comprises adding to the dyebath a small quantity of a water-soluble product which in its free base form is the condensation product of 4 to 8 molecular proportions of ethylene oxide and one molecular proportion of an amine of the formula

wherein $R_1$ is selected from the group consisting of hydrogen and methyl, and $R_2$ is selected from the group consisting of dodecyl, oleyl and hydrogenated abietyl.

2. A composition of matter containing an agent yielding metal and a water-soluble product which in its free base form is the condensation product of 4 to 8 molecular proportions of ethylene oxide and one molecular proportion of an amine of the formula

wherein $R_1$ is selected from the group consisting of hydrogen and methyl, and $R_2$ is selected from the group consisting of dodecyl, oleyl and hydrogenated abietyl.

3. A process for dyeing wool with chromable wool dyestuffs by the single bath metallizing process in the presence of an agent yielding chromium, which comprises adding to the dyebath a small quantity of a reaction product of 1 molecular proportion of oleylamine and 8 molecular proportions of ethylene oxide.

4. A process for dyeing wool with chromable wool dyestuffs by the single bath metallizing process in the presence of an agent yielding chromium which comprises adding to the dyebath a small quantity of a reaction product of 1 molecular proportion of hydrogenated abietylamine and 5 molecular proportions of ethylene oxide.

5. A composition of matter containing sodium monochromate and the reaction product of 1 molecular proportion of methyl-laurylamine and 5 molecular proportions of ethylene oxide which reaction product has been quaternated with dimethyl sulfate.

6. A composition of matter containing the azodyestuff obtained by coupling diazotized 1-hydroxy-2-amino-4-nitrobenzene with 1:3-diaminobenzene-4-sulfonic acid and the reaction product of 1 molecular proportion of oleylamine and 8 molecular proportions of ethylene oxide.

References Cited in the file of this patent

UNITED STATES PATENTS

| | | |
|---|---|---|
| 2,434,178 | Royer | Jan 6, 1948 |
| 2,520,105 | Millson | Aug. 22, 1950 |
| 2,638,404 | Millson | May 12, 1953 |
| 2,649,478 | Carnes | Aug. 18, 1953 |

FOREIGN PATENTS

| | | |
|---|---|---|
| 380,851 | Great Britain | Sept. 12, 1932 |
| 241,199 | Switzerland | July 1, 1946 |

OTHER REFERENCES

Widmar et al.: Abstract of application Serial No. 31,606, published March 20, 1951, 644 O. G. 914.